(No Model.)
T. W. SHEPHERD.
METALLIC THERMOMETER.
No. 382,561. Patented May 8, 1888.
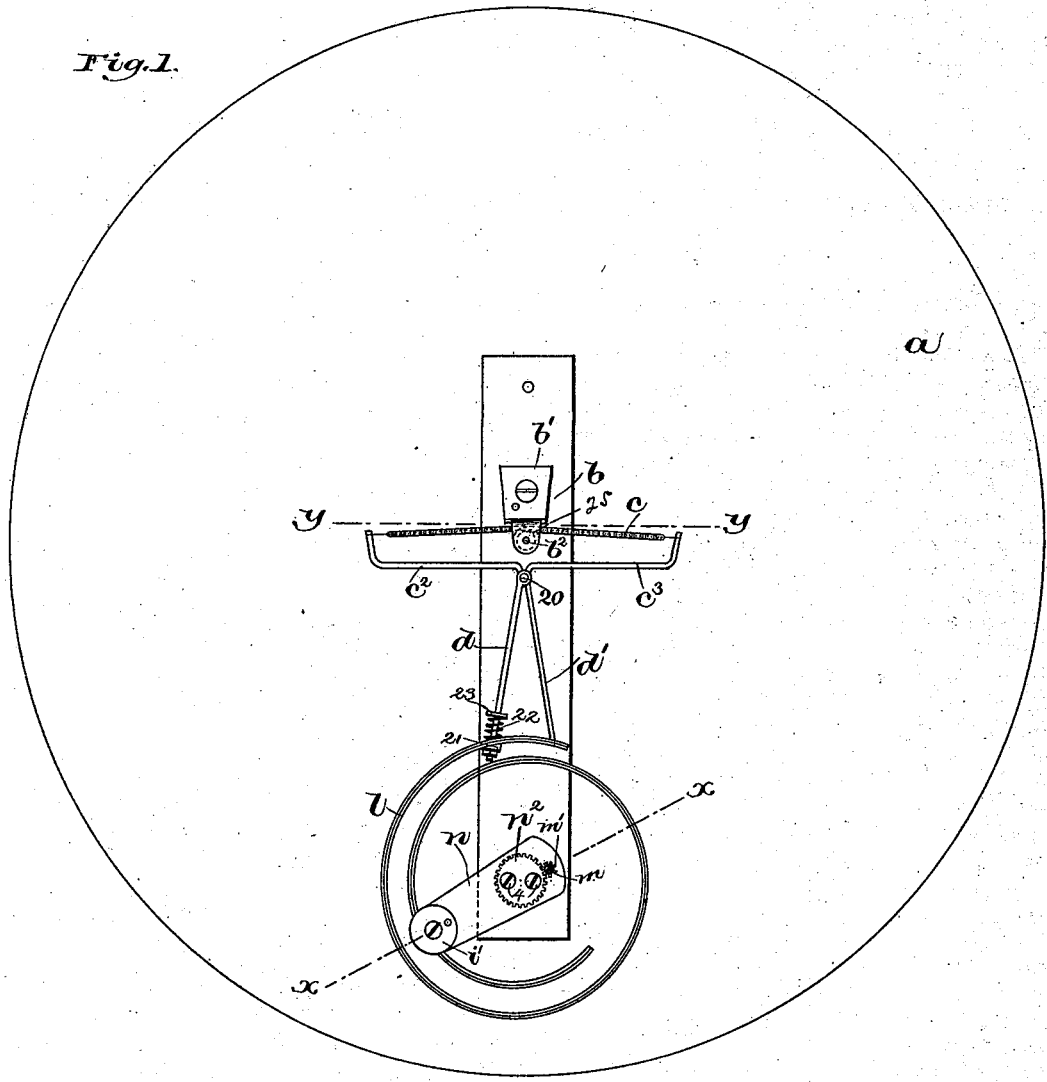
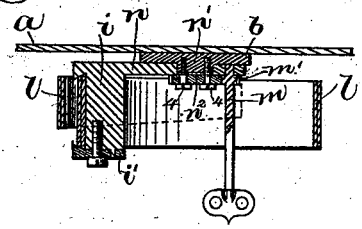
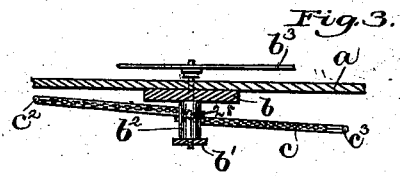
Witnesses.
C. M. Cone.
Fred L. Emery.
Inventor,
Thomas W. Shepherd.
by Crosby & Gregory.
Attys.
N. PETERS, Photo-Lithographer, Washington, D. C.

UNITED STATES PATENT OFFICE.

THOMAS WM. SHEPHERD, OF PEABODY, MASSACHUSETTS.

METALLIC THERMOMETER.

SPECIFICATION forming part of Letters Patent No. 382,561, dated May 8, 1888.

Application filed March 22, 1887. Serial No. 231,887. (No model.)

*To all whom it may concern:*

Be it known that I, THOMAS WM. SHEPHERD, residing at Peabody, county of Essex, and State of Massachusetts, have invented an Improvement in Metallic Thermometers, of which the following description, in connection with the accompanying drawings, is a specification, like letters on the drawings representing like parts.

This invention has for its object to construct a cheap, durable, and effective thermometer of the class commonly termed "metallic thermometers;" and the invention consists in various details of construction, to be hereinafter pointed out.

The device sensitive to the change of temperature consists of a bimetallic thermal strip, the width of which is considerably less at its outer or free end than at its point of attachment. A cord or chain suspended tightly between the ends of a yoke is coiled one or more times around the arbor or shaft carrying the pointer, and the said yoke, in order that it may be given considerable movement in each direction, is attached to the free or outer end of the bimetallic thermal strip by an arm. Suitable adjusting devices are provided for varying the distance between the ends of the yoke, and also for setting the pointer in a determinate position.

Figure 1 shows an inside view of a metallic thermometer embodying this invention; Fig. 2, a cross-section of the thermometer shown in Fig. 1 and taken on the dotted line $x\ x$, and Fig. 3 a cross-section of the thermometer shown in Fig. 1 and taken on the dotted line $y\ y$.

The disk $a$, or dial, as it may be, has secured to its rear or inner side a plate or frame, $b$, to which is attached a standard, $b'$, which, together with the plate $b$, serve as bearings for the shaft or arbor $b^2$, carrying the pointer $b^3$. A cord or chain, $c$, is tightly suspended between the opposite ends of a yoke composed of two arms, $c^2\ c^3$, said cord or chain passing through a hole, 25, passing diametrically through the shaft or arbor $b^2$, and afterward wound around said shaft, as desired, so that as the yoke $c^2\ c^3$ is moved in one or the other direction the pointer will be correspondingly moved.

The yoke $c^2\ c^3$ is herein shown as attached to the free or outer end of the bimetallic thermal strip $l$ by two arms, $d\ d'$, the arm $d$ and the arm $c^3$ of the yoke being formed of a single piece of wire, and the arm $d'$ and the arm $c^2$ of the yoke being also formed of a single piece of wire, the two parts being pivoted together at their point of intersection, 20. The arm $d'$ is rigidly connected with the bimetallic thermal strip, and the arm $d$, passed loosely through a hole in the bimetallic thermal strip, is screw-threaded at its end and provided with a nut, 21.

A spring, 22, surrounds the arm $d$ at that side of the bimetallic thermal strip opposite the nut 21, one end of the said spring bearing against a flange or projection, 23, and the other end against the bimetallic thermal strip, so that by rotating the nut 21 the arm $d$ will be moved against the tension of the said spring.

It will be seen that by rotating the nut the outer ends of the two arms of the yoke may be moved toward or from each other, according to the direction the nut is turned, to thereby either slacken or tighten the cord or chain.

It is obvious that the yoke and arms may be made in one piece and rigidly secured to the bimetallic thermal strip if adjustment for changing the tension of the cord or chain is not desired; and, furthermore, if desired, the yoke may be formed in one piece and secured to the two arms $d\ d'$, the said arms being constructed as described, so that by rotating the nut the yoke will be moved slightly in one or the other direction to aid in setting the pointer in a determinate position.

The yoke $c^2\ c^3$ is herein shown as attached to the supporting-arms at an angle with relation to the plane of the disk or dial $a$, as shown in Fig. 3, so that the cord or chain $c$ may be wound upon the arbor or shaft $b^2$ spirally in such manner that each coil will not in any way interfere with, chafe, or affect another coil to increase the friction incurred by one coil overlapping or rubbing against another.

The bimetallic thermal strip $l$ is fitted in a dovetailed recess formed in a standard or support, $i$, (see Fig. 2,) said recess being herein shown as formed by cutting away one side of the standard or support from its end toward its base, thus leaving a shoulder at the base having an inclined inner bearing-face, the end of the standard having secured to it a cap, $i'$, which is provided with a projection having an inclined bearing-face to thus form the opposite inclined wall of the dovetailed recess.

The standard or support $i$ is attached to or forms a part of the arm $n$, fitted onto a stud, $n'$, of the plate $b$, and adapted to be moved on said stud as a pivot. A toothed wheel, $n^2$, is placed against the arm $n$ above the stud $n'$, and secured to the stud by two screws, 4 4, to thereby clamp the arm $n$ firmly against the plate $b$.

The plate $n$ is provided with a hole, which receives the bearing end of a key or short shaft, $m$, having a toothed flange or portion, $m'$, meshing with the toothed disk or wheel $n^2$, the key $m$ when inserted serving to adjust the pointer by moving the bimetallic thermal strip.

The operation is as follows: The key $m$ is placed in position and the screws 4 4 loosened to permit the arm $n$ to be moved while the toothed disk $n^2$ remains rigid. The key $m$, with its toothed flange or portion $m'$ in engagement with the teeth of the disk $n^2$, is then rotated, thereby moving the arm $n$ about the stud or pivot $n'$, after which the screws 4 4 are tightened.

By attaching the yoke to the bimetallic thermal strip by the supporting-arms, as described, a larger field of motion is given to the yoke than were it attached directly to the bimetallic thermal strip, and such movement is necessary to move the pointer any perceptible distance, as it will be seen that the movement of the bimetallic thermal strip itself is but slight for considerable variation in temperature.

By making the bimetallic thermal strip of a much less width at its free end than at its point of attachment, the weight of the bimetallic thermal strip at the free end is materially reduced, so that the necessary jar occasioned by shipment does not in any way impair the adjustment of the device.

I claim—

1. In a thermometer, the combination of a Y-shaped yoke, a cord or chain suspended between its ends, and the pointer-operating shaft or arbor directly engaged by the said cord or chain, and a supporting-arm for the yoke, and a bimetallic strip, to which the supporting-arm is attached, substantially as described.

2. In a thermometer, the combination of a Y-shaped yoke, a cord or chain suspended between its ends, and the pointer shaft or arbor engaged by the said cord or chain, and the supporting-arms $d\ d'$, one of which, as $d$, is made adjustable, and the bimetallic strip, to which the said arms $d\ d'$ are attached, substantially as described.

3. In a thermometer, the combination of a Y-shaped yoke composed of the two arms $c^2\ c^3$ and the two supporting-arms $d\ d'$, respectively forming a part of the arms $c^2\ c^3$, and pivoted together at their point of intersection, and the bimetallic strip, to which one of the arms, as $d'$, is rigidly connected, and the other arm, as $d$, is adjustably connected, substantially as described.

4. In the thermometer, the yoke and supporting-arm, to which the said yoke is attached in a plane at a slight angle with relation to the plane of rotation of the shaft or arbor, the cord or chain combined with the shaft or arbor for operating the pointer thereon, around which the cord or chain passes spirally, substantially as described.

5. A bimetallic thermal strip adjustably suspended at one end, the free end of the said strip being made narrower than the fixed end, substantially as and for the purpose set forth.

6. In a thermometer, the combination of a bimetallic thermal strip and the standard $i$, formed with the dovetailed recess in its outer side, in which the said bimetallic thermal strip is clamped adjustably, as set forth.

7. In a thermometer, the combination of a bimetallic strip and its pivoted supporting-arm $n$, and a clamp to hold the arm $n$ in fixed position, and means, substantially as described, for moving the arm when released by the clamp to adjust the pointer by movement of the bimetallic strip, as set forth.

8. In a thermometer, the combination of a bimetallic strip, its pivoted supporting-arm $n$, and the toothed disk or clamp $n^2$, and the key $m$, engaging the supporting-arm and turning about the disk $n^2$, for moving the said supporting-arm on its pivot, as set forth.

9. In a thermometer, the combination of a bimetallic strip, its pivoted supporting-arm, and a clamp detachably secured to the pivot of the supporting-arm for holding said arm in fixed position, substantially as described.

In testimony whereof I have signed my name to this specification in the presence of two subscribing witnesses.

THOMAS WM. SHEPHERD.

Witnesses:
SAMUEL C. LORD,
GEO. HOLMAN.